Oct. 31, 1967 W. STUIBER ET AL 3,349,885
TYPE BAR DRIVE COMPOSED OF TWO DIFFERENT COMPONENTS
Filed March 21, 1966
8 Sheets-Sheet 6

INVENTORS
Walter Stuiber
Georg Müller

BY Michael J. Striker

United States Patent Office 3,349,885
Patented Oct. 31, 1967

3,349,885
TYPE BAR DRIVE COMPOSED OF TWO DIFFERENT COMPONENTS
Walter Stuiber, Stein, near Nurnberg, and Georg Mueller, Schwabach, Germany, assignors to Max Grundig, Furth, Bavaria, Germany
Filed Mar. 21, 1966, Ser. No. 535,989
Claims priority, application Germany, Mar. 20, 1965, G 43,130
11 Claims. (Cl. 197—17)

ABSTRACT OF THE DISCLOSURE

A type bar or a typing head is first moved to a position of readiness opposite a platen, and then pressed against the platen by an electromagnet whose force depends on the shape of the attracted portion so that different type faces are pressed with different magnetic forces against the impression area.

---

The present invention relates to an apparatus for making impressions, and more particularly to an apparatus for actuating the printing or typing means of business machines such as power operated typewriters and calculators.

Power driven typewriters and other printing business machines develop considerable noise when operated at high speed for producing the greatest possible number of impressions within a given time.

For example, in an electric typewriter, the type bars have to have a high average speed corresponding to a high typing speed, but if the speed of the type bar is high at the moment in which the type face makes an impact on the impression area, a loud noise is produced.

In a known electric typewriter, the type action is actuated by a continuously rotating power roll and driven by the same over an angle for about 60 degrees. During the last third of the movement, the type bar is gradually braked by return springs, and when the impact has been made, the type bar is returned by the tensioned return springs to its normal position of rest. While such a type action drive permits a high writing speed, it has the disadvantage that the final speed of the type bar at the moment of impact is still far too high. In order to reduce the impact force to the force necessary for producing a proper impression or imprint, the excessive kinetic energy of the type bar is reduced by a braking member located in the path of movement of the type bars and slowing the same down before the impact of the type face on the impression area. However, the impact of the moving type bar on the braking member causes a considerable noise.

It is one object of the invention to provide a typewriter which operates at high speed, but produces little noise.

Another object of the invention is to provide a typewriter in which the type bars move at a high average speed, while the final speed of each type bar at the moment of impact is just sufficient for producing a proper impression.

Another object of the invention is to provide first drive means for moving a type bar toward the impression area to a position near the same, and second drive means for moving the type bar at a lower speed into an impression making position.

Another object of the invention is to use electromagnetic means which are energized under the control of a switch actuated during the first part of the movement of the type bar, and move the type bar during the last part of its movement into the impression-making position.

It is known that type faces having different areas, for example the type face representing a period, and a type face representing an M, produce imprints of different density, darkness and appearance if pressed with the same force against the impression area. While known business machines require very complicated devices for producing uniform imprints from type faces having different areas, the present invention permits the solving of this problem in a very simple manner.

In accordance with the present invention, the portion of the impression means, for as a type bar, serves as an armature for an electromagnetic means which moves the impression means to an operative position in which a type face thereof engages the impression area. By varying the shape and cross section of this armature portion in accordance with the face area of the type face, the forces exerted by the electromagnetic means on the impression means are different so that a character having a small type face is pressed against the impression area with a lesser force than a character having a large type face.

It is consequently another object of the invention to provide for different type faces, different armature portions attracted by electromagnetic means with different forces corresponding to the type face area of the respective type, so that uniform imprints are produced by different type faces.

With these objects in view, the present invention relates to an apparatus for making successive impressions at a high speed and at a low noise level. One embodiment of the invention comprises counter pressure means having an impression area, such as a platen of a paper carriage; impression means having a plurality of type faces, for example the set of type bar of a typewriter, or a rotary type head, or the type bar of the printing mechanism of a calculator; drive means, such as a power roll, for moving the impression means to and from a position of readiness in which one of the type faces is located near and opposite the impression area; selector means, preferably including a manually operated keyboard, and controlling the drive means so that a selected type face is placed opposite the impression area; circuit means including switch means connected with the electromagnetic means for energizing the same; and actuating means for the switch means operated by the drive means so that the electromagnetic means is energized when the impression means is in the position of readiness.

Consequently, the electromagnetic means determines the pressure of the selected type face on the impression area, and such pressure is independent of the speed of movement of the impression means to the position of readiness.

In the embodiment of the invention which is used for an electric typewriter, the type actions and type bars constitute the impression means, and a power roll and associated coupling means constitute the drive means for moving the type bars to the position of readiness. During such movement, the switch means is closed, and an electric drive means in the form of an electromagnetic means is energized to attract an armature portion of the respective selected type bar until the type face of the respective type bar makes the impression.

In order to adapt the force of the impact to the different size of the characters on the type faces, armature members of different size are selectively attached to the type bars, on the same may be made of a magnetizable material, and perforated to reduce the cross section of the flux path in accordance with the size of the character.

In order to cause only a very short energization of the electromagnetic means, the switch means is provided in a circuit including resistors and a capacitor so that the capacitor is charged over the resistances and is discharged over the closed switch means to provide a short energizing impulse for the electromagnetic means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Referring now to the drawing, and more particularly to FIGS. 1 to 4 which illustrate an electric typewriter modified in accordance with the present invention, a power roll 1 continuously rotates in counterclockwise direction for operating type actions, each of which includes a coupling wheel 2 mounted on a shaft 3 for turning movement. Each coupling wheel 2 has two recessed peripheral portions 2a and 2b, and two coupling portions 2c and 2d which are positioned to cooperate with the peripheral surface of the power roll 1.

A link 9 is connected by pivot 8 to coupling wheel 2, and by a pivot 8a to a lever 11 which is mounted on a shaft 10 for angular movement. A spring 13 connects link 9 with lever 11, and urges coupling wheel 2 to turn out of the position illustrated in FIG. 1 in clockwise direction. Such clockwise turning is prevented by a stop 7 on coupling wheel 2 which abuts in the position of rest of FIG. 1 on a transverse projection 6a on a blocking member 6 which is mounted by means of a slot on a pin 4 for turning and sliding movement. A spring 24 connects blocking member 6 with key lever 23 which is mounted for turning movement on a shaft 22 and can be moved to a depressed position by manual operation. Blocking member 6 abuts a stop 5 on the frame under the action of spring 24, and another spring 12 is connected to a pin 12a on the frame and with lever 11 to urge the same to turn in counterclockwise direction. Lever 11 is connected by a wire 14 to a projecting arm of a type bar 17 which is mounted on a curved shaft 15 in the support segment 16 of the typewriter. Type bar 17 has a type with type faces 17c.

Figure 1:
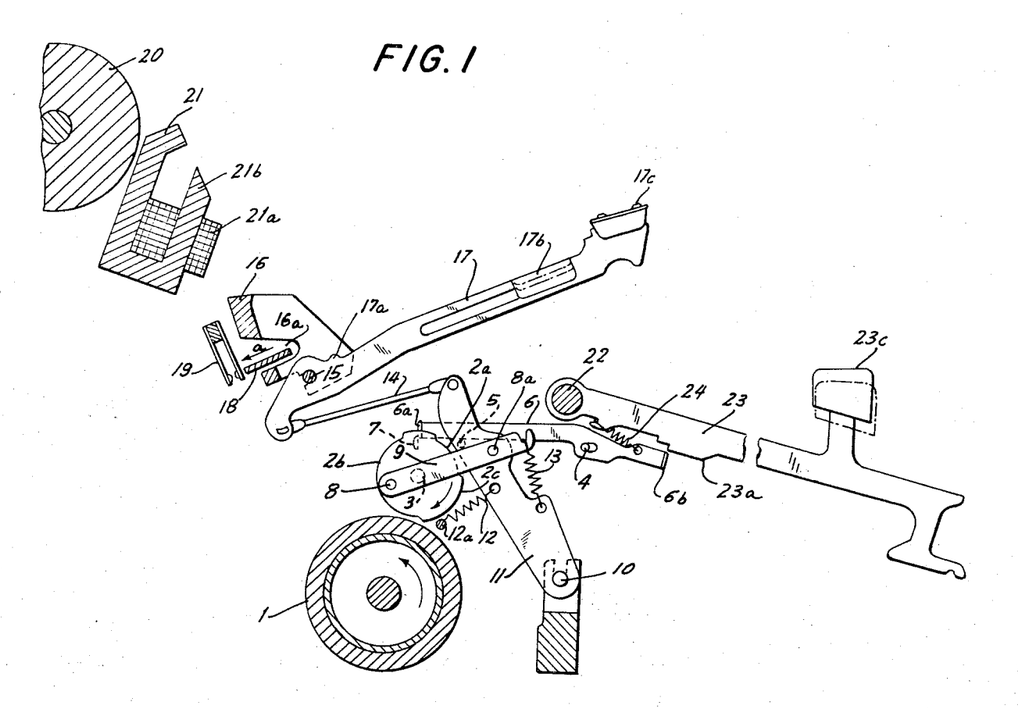
FIG. 1 is a fragmentary elevation, partially in section, illustrating an embodiment of the present invention applied to an electric typewriter.

Each type bar is movable between the position shown in FIG. 1 and a position in which type face 17c is located opposite and near the impression area of a platen or other counterpressure means, which is mounted on a paper carriage, not shown.

Figure 4:
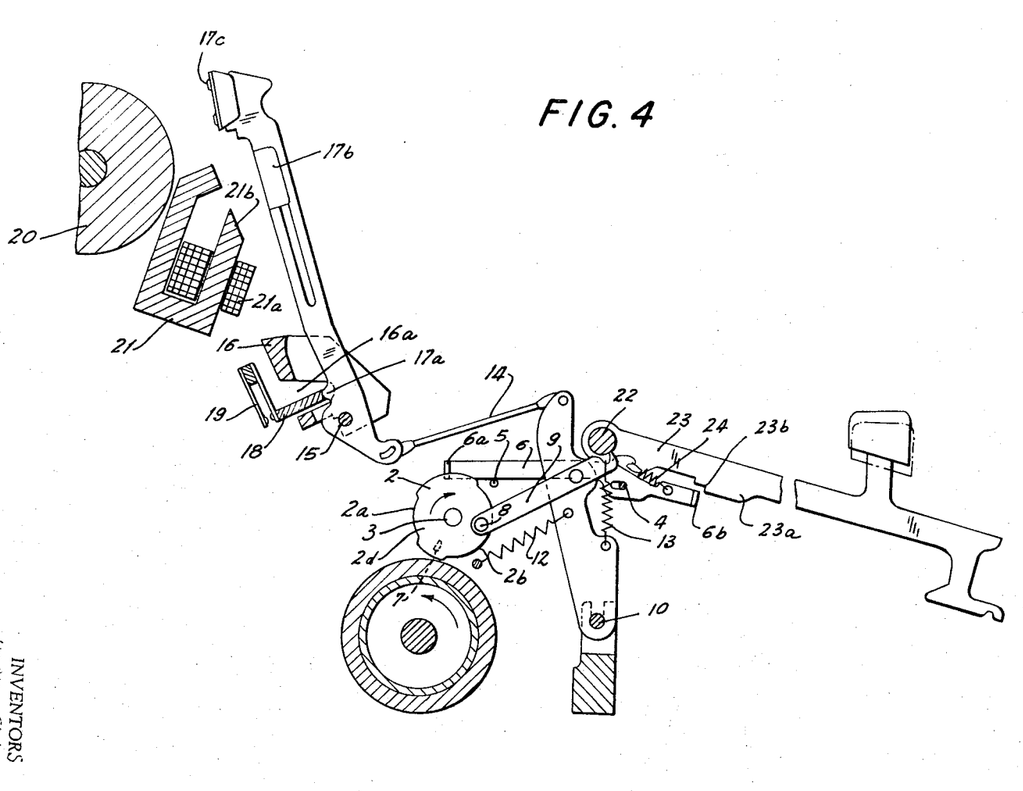

An electric drive means in the form of an electromagnetic means 21 is located near the impression area and cooperates in the position of FIG. 4 with an armature member 17b shown to be a U-shaped plate bent about the type bar 17. Electromagnetic means 21 has a winding 21a about one leg of a substantially U-shaped core 21b whose pole shoes cooperate with armature member 17b to establish a flux through the same when the type bar is located close to the pole shoes 21b and to the impression area on platen 20.

Figure 1A:
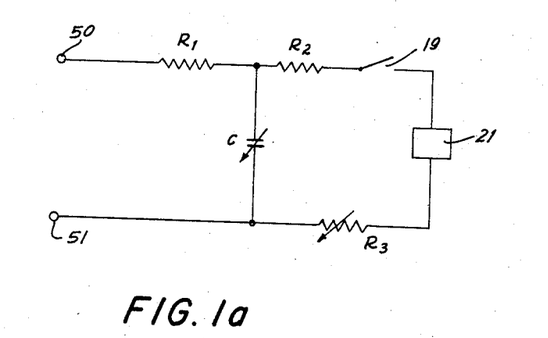
FIG. 1a is a diagram illustrating an electric circuit according to the present invention.

The type segment 16 has a cut-out 16a in which a universal bar 18 is located. Universal bar 18 is movable, and displaced by engagement with a projection 17a on each of the type bars 17 when the same moves toward the platen. The universal bar 18 is generally used for operating the escapement mechanism of the paper carriage, but in the present invention it is used also for closing a switch 19 which is located in the circuit of the winding 21a. The switch may be directly connected in series with winding 21a and a voltage source, but in the preferred embodiment of the invention, the circuit of FIG. 1a is used.

Electromagnetic means 21 is connected in series with switch 19 and with two resistors R1 and R2, and an adjustable resistor R3. A capacitor C is connected to the terminal 51 and to a point between resistors R1 and R2. A voltage source is applied to terminals 50 and 51. The capacitor is charged through resistor R1, and when switch 19 is closed, the capacitor discharges through resistors R2, R3 and the winding of electromagnetic means 21 so that the electromagnetic means 21 is energized for a short time. The amount of current flowing through the winding of electromagnetic means 21 can be varied by adjustment of resistor R3.

Figure 2:
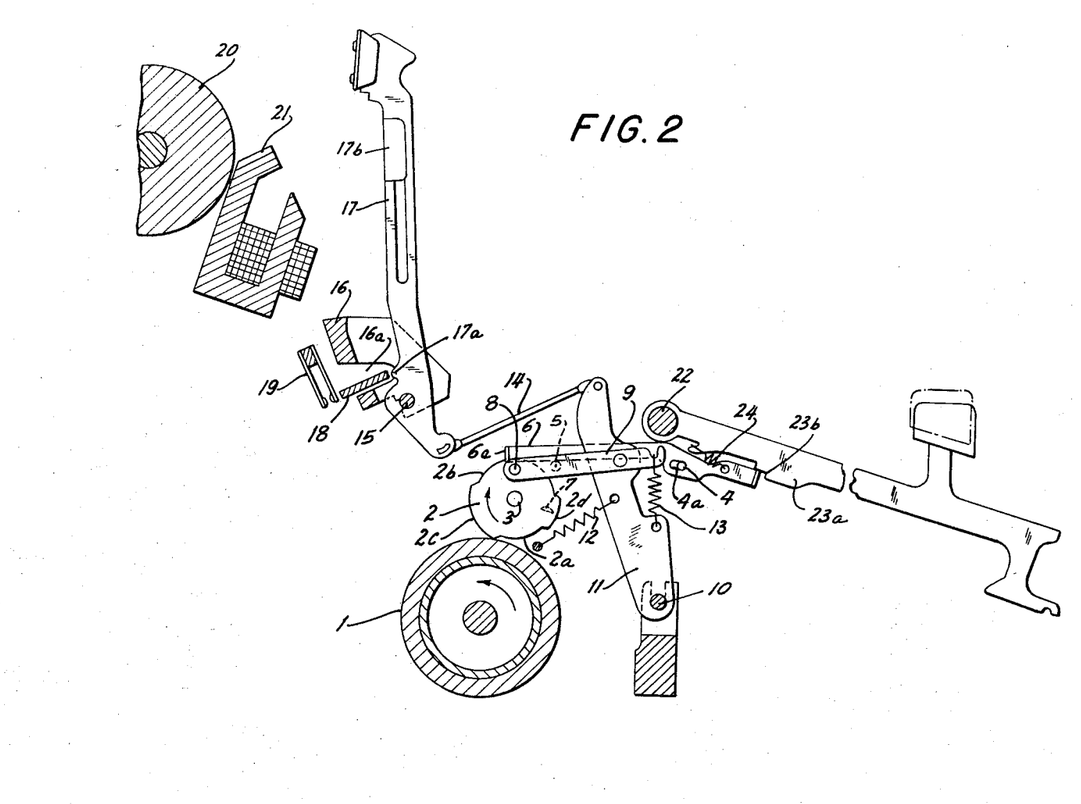
FIG. 2, FIG. 3, and FIG. 4 are fragmentary elevations, partially in section, illustrating successive operational positions of the embodiment of FIG. 1.

When a selected key lever 23 is depressed by manual operation of key 23c, a key lever portion 23a engages a transverse projection 6b on blocking member 6, and turns the same about pin 4 so that blocking projection 6a is moved away from stop 7 on coupling wheel 2, while spring 24 shifts blocking member 6 to the left on pin 4 to the position shown in FIG. 2. Since coupling wheel 2 is now free to turn in clockwise direction, it can be turned a short distance by lever 9 on which spring 13 acts. The small angular displacement in clockwise direction obtained in this manner is sufficient to place the cam portion 2c of coupling wheel 2 in frictional engagement with power roll 3 so that coupling wheel 2 is further turned in clockwise direction to the position of FIG. 2 in which pin 8 has moved to the right with lever 9, and has turned lever 11 in clockwise direction to the position of FIG. 2. Type bar 17 is turned by lever 11 through wire 12 and moves at great speed toward platen 20. While cam portion 2c is effective, type bar 12 is displaced out of its position of rest an angle of substantially 50 degrees.

Further turning of the coupling wheel 2 places the recessed portion 2a opposite the power roll so that the type bar is no longer driven by the power roll, but moves due to its inertia toward the platen 20.

Since the type bar is not power driven while approaching the impression area on platen 20, two type bars which were accidentally simultaneously actuated by simultaneous manual engagement of two adjacent keys, can be easily disentangled since the power of the power roll need not be overcome.

Figure 3:
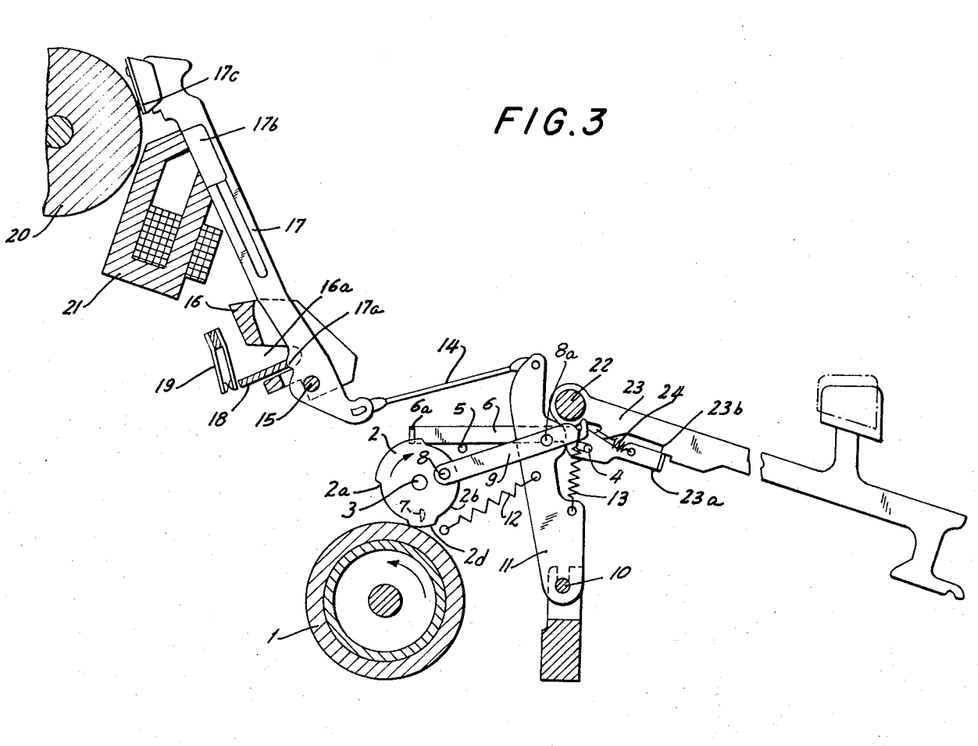

During normal operation, the type bar which was selected by operation of a selector key 23c, moves due to its inertia toward the platen while turning coupling wheel 2 through members 14, 11, and 9 until the leading edge of the cam portion 2d engages the power roll in the position of FIG. 3. The type bar is again driven, but at a reduced speed, since pivot 8 moves from the dead center position shown in FIG. 3 along a path transverse to lever 9 so that the same is turned about pivot 8 and does not displace lever 11 substantially in clockwise direction. When pivot 8 is in the dead center position of FIG. 3, spaced 180 degrees from the initial position of FIG. 1, type bar 17 begins to move away from the platen, and directly before the dead center position of FIG. 3 is assumed, the type face 17c is located very near the impression area of platen 20 in a position of readiness, and armature member 17b is located very near the pole shoes of the core 21b of electromagnetic means 21.

In this position of readiness, projection 17a engages universal bar 18, which is displaced and closes switch 19, as shown in FIG. 3.

As explained with reference to FIG. 1a, switch 19 completes the circuit so that capacitor C discharges over the winding 21a of electromagnetic means 21, producing a magnetic flux in core 21b by which armature members 17b and thereby type bar 17 are attracted to assume an operative impression making position in which type face 17c is pressed against the impression area of the platen solely by the electromagnetic force produced by electromagnetic means 21 while recess 2a is still opposite the power roll. At the time of the impression, coupling member 2 is in a position in which the leading edge of a cam portion 2d engages the power roll so that the power roll begins to rotate coupling member 2. Lever 9 passes at this moment through a dead center position so that the type bar starts.

Coupling wheel 2 is further rotated by power roll 1 acting on cam portion 2d so that coupling wheel 2 is turned to the position of FIG. 4 in which pivot 8 has traveled beyond its dead center position, and has moved lever 11 in counterclockwise direction whereby type bar 17 is turned in clockwise direction so that the type face 17c moves away from the impression area, as shown in FIG. 4. Since capacitor C provided only a very short energizing impulse, the magnetic flux is terminated when the type bar 17 is retracted by the drive means 1, 2, 9, 11.

When type bar 17 moves beyond the position of FIG. 4, its projection 17a releases the universal bar 18, and the switch opens so that capacitor C is charged over resistor R1.

When the trailing end of cam portion 2d has passed the power roll, and recessed portion 2b is located opposite the same, the type action is no longer driven by the power roll, and the type bar is returned by the action of springs 12 and 13 until it arrives in its normal position of rest shown in FIG. 1. The disengagement of the power roll from the type actions permits again the separation of two accidentally entangled type bars. One actuation of a key will result in one revolution of coupling wheel 2 and in one actuation of a type bar. After one revolution of coupling wheel 2, stop 7 again engages projection 6a of blocking lever 6 so that the coupling wheel is stopped.

Since due to slot 4a, spring 24 shifts blocking lever 6 to the left when projection 6a releases stop 7 in the position of FIG. 2, projection 6b moves from the projecting portion 23a of key lever 23 to the recessed portion 23b so that even if key lever 23 is held depressed, projection 6a will be located sufficiently low to be engaged by stop 7 after one revolution. A repeat actuation can be obtained in a known manner by further depressing key lever 23 below the position shown in solid lines in FIG. 2.

From the above description of the embodiment of FIGS. 1 to 4, it will be apparent that the set of type bars 17 constitutes an impression means which is placed by drive means 1, 2, 9, 11 in a position of readiness when pivot 8 is in its forward dead center position, substantially as shown in FIG. 3. In this position of readiness, the movement of the type bar is about to be reversed so that the impression force is provided only by the electromagnetic means 21 whose switch 19 is closed by actuating means 18 and 17a by the force of the power roll of the drive means. Keys 23c, key levers 23, and blocking members 6 constitute selecting means for selecting a particular type bar and type face to be moved to the position of readiness by the drive means including power roll 1.

Since the pressure at which the impression is made by a selected type face depends on the electromagnetic force of electromagnetic means 21, the impression density can be adjusted for all type bars simultaneously by adjustment of resistor R3 shown in FIG. 1a. Depending on the adjusted current flowing through winding 21a, the impression pressure of all type bars can be adjusted, for example in accordance with the number of carbon copies to be made.

However, an individual adjustment according to the size and area of the different type faces is also required, and is accomplished in accordance with the present invention by placing magnetizable members 17b of different size on the respective type bar 17. When a great impression force is required, for example for characters like M or W, a large magnetizable member 17b will be used so that the magnetic flux produced by electromagnetic means 21 encounters low magnetic resistance when pressing the type bar and type face against the platen. However, if the size of the type face is small, and the type face represents, for example, a period, or if the size of the type face is intermediate, for example a small $n$, magnetizable members 17b of different size are used, as indicated in broken lines in FIG. 1. It will be appreciated that more than three different sizes of magnetizable members may be used in order to obtain the same specific pressure for all type faces, irrespective of the size and area thereof. After the impression pressure of all type faces has thus been adjusted, the impression pressure of all type faces can be simultaneously adjusted in accordance with the number of carbon copies or with the desired appearance fo the imprint by adjusting resistor R3, as explained above.

It is also possible to make at least a portion of each type bar through which the magnetic flux passes of a magnetizable material, and to perforate the respective magnetizable portions with holes of different size and diameter for varying the cross section through which the magnetic flux passes in accordance with the size of the type face, as will be explained hereinafter with reference to the embodiment of FIG. 8.

Office printing machines are known whose general construction is similar to a typewriter, but which use a rotary type head provided with a plurality of peripheral circular rows of type faces arranged in columns. The type head rotates until it is stopped under the control of a keyboard in a position in which a selected column is located opposite the impression area, and tilted until a selected type face in the respective column is located opposite the impression area. Thereupon, the type head is moved toward the impression area to produce an imprint of the selected type face.

Figure 5:
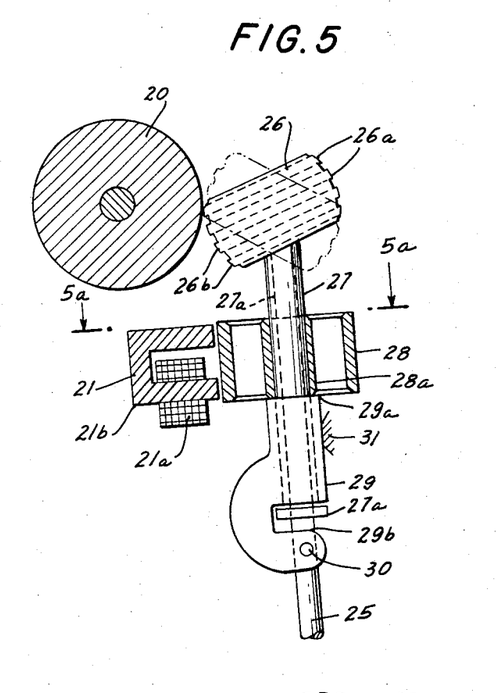
FIG. 5 is a fragmentary side elevation, partially in section, illustrating another embodiment of the invention applied to a rotary type head.
Figure 6:
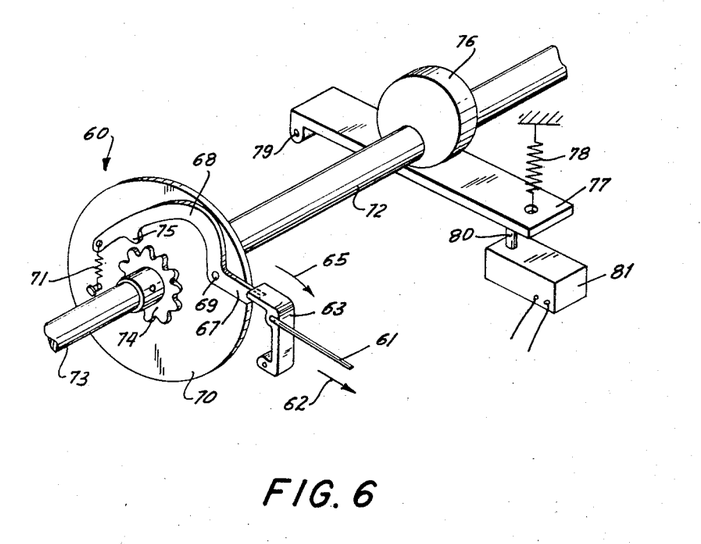
FIG. 6 is a fragmentary perspective view illustrating switch actuating means provided in the embodiment of FIG. 5.
Figure 7:
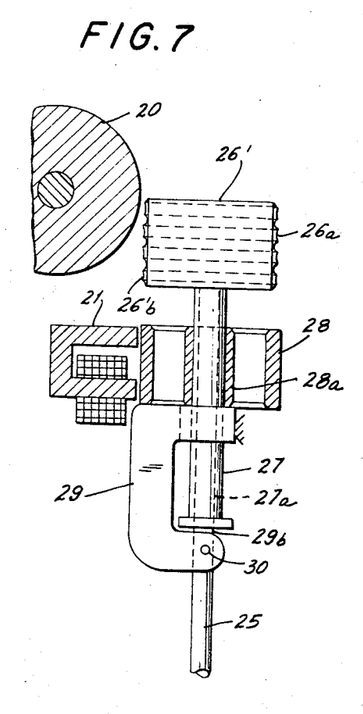
FIG. 7 is a fragmentary side elevation, partially in section, illustrating a modified type head construction provided with the apparatus of the invention.

An office printing machine of this type is disclosed, for example, in the U.S. Patent 2,879,876. The embodiments of the invention illustrated in FIGS. 5 to 7 are applied to printing machines having a rotary type head. In the embodiment of the FIG. 5, the type head 26 is barrel-shaped and has type faces arranged in circular rows 26a, and in columns 26b. A column 26b is selected by stopping the rotary type head in the respective angular position, and a character of the column is selected by tilting the type head between the terminal positions shown in solid and broken lines, respectively.

In the embodiment of FIG. 7, the type head 26' is cylindrical, a column of type faces 26'b is selected by stopping rotation of the type head, and a particular type face in the selected column is selected by raising the type head 26' to such a height that the respective circular row of type faces 26a is located opposite the impression area of platen 20. These constructions are known, and not an object of the present invention.

Referring to the embodiment of FIG. 5, the type head 26 is secured to a hollow shaft 27 which has at its lower end a flange 27a. Shaft 27 and type head 26 are mounted for rotary and axial movement on a support shaft 25 which is tiltable toward and away from platen 20. An armature drum 28 is secured by hub 28a to the hollow shaft 27 and rotates in synchronism with the type head. Armature 28 rests on the top face 29a of a stop member 29 which is secured by a pin 30 to support shaft 25. Flange 27a is located in a cut-out 29b of stop member 29 so that axial movement of shaft 27 and type head 26 is limited.

Armature 28 has a plurality of axially extending ribs 28c separated by grooves 28b. The number of the projecting armature portions 28c is the same as the number of type faces in each circular row 26a, and each armature portion 28c is located opposite the pole shoes of core 21b when a corresponding column of type faces 26b is located opposite platen 20.

Figure 5A:
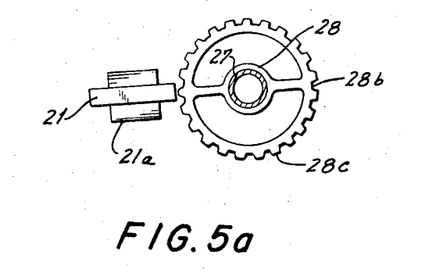
FIG. 5a is a fragmentary plan view taken on line Va—Va in FIG. 5.

As best seen in FIG. 5a, the magnetizable armature portions 28c have different circumferential width so that the flux of electromagnetic means 21 encounters different resistance depending on whether a smaller or larger magnetizable armature portion 28c is located opposite core 21b.

The circumferential extension of the armature portion 28c is selected in accordance with the size and area of the character on the type faces in the respective column of type faces 26b. Since the magnetic force is the same for all type faces in the same column, type faces having different areas are placed in different columns, and type faces having substantially the same area are placed in the same column.

A spring, not shown, urges the type head assembly to the right as viewed in FIG. 5 against an abutment 31, and whenever electromagnetic means 21 is energized, armature 28 is attracted, and the assembly is tilted in counterclockwise direction so that the selected type face which is located opposite the impression area of platen 20, is pressed against the platen at a force which depends on the circumferential extension of the respective armature portion 28c located opposite electromagnetic means 21. In the embodiment of FIG. 7, in which the type head is cylindrical, an armature 28, as described with reference to FIGS. 5 and 5a, cooperates with electromagnetic means 21 to move type head 26′ from the illustrated position of readiness to the impression making position in which one of the type faces engages the impression area on platen 20. The type head 26′ is raised or lowered, instead of being tilted as in the construction of FIG. 5 for the selection of a particular type face, but since the means for raising or tilting the type head are well known and not an object of the invention, reference is made to the U.S. Patent 2,879,876 which discloses key levers acting through interposers on selecting bails for placing the type head through selecting wires in a position of readiness in which a selected type face is located opposite the impression area. After the selection of the type face has been completed, a clutch is actuated which couples the drive means to the type head to produce the imprint.

A similar arrangement may be used in the apparatus of the invention for carrying out the selection and the placement of a selected type face in a position of readiness opposite the impression area.

In accordance with the present invention no clutch connecting drive means with printing means is provided, but as shown in FIG. 6, a wire 61 is moved in the direction of the arrow 62 when a type face has been selected, and shifts a stop member 66 about its pivot 64 to turn in the direction of the arrow 65 so that a coupling member 68 which is pivotally mounted on a coupling disk 70 secured to a shaft 72 is released, and is turned by spring 71 in counterclockwise direction as viewed in FIG. 6 to a position in which its coupling projection 75 engages a corresponding recess in a toothed coupling wheel 74 which is secured to a drive shaft 73. Shaft 72 which is secured to coupling disk 70, carries an eccentric cam 76 which cooperates with a lever 77 mounted on a shaft 79 and being urged by spring 78 into engagement with eccentric cam 76. A switch 81 has an actuating button 80 cooperating with cam follower lever 77. Switch 81 corresponds to switch 19 of the embodiment of FIGS. 1 to 4, and is located in the circuit of FIG. 1a in series with the winding 21a of electromagnetic means 21.

When stop member 66 releases coupling member 68, and the one revolution coupling 60 is engaged, eccentric member 76 is turned and cam follower 77 actuates switch 81 so that winding 21a is energized, and armature 28, together with the type head assembly is attracted toward electromagnetic means 21 for moving the type head 26 of the embodiment of FIG. 5, or 26′ of the embodiment of FIG. 7 to an impression making position in which the previously selected type face engages the impression area.

After the impression has been made, coupling disk 70 with coupling member 68 complete one revolution, and arm 67 of coupling member 68 is stopped by stop member 63 so that coupling projection 75 releases coupling pinion 74, and shaft 72 stops.

From the above description of the embodiments of FIGS. 5 to 7, it will become apparent that switch means 81 of electromagnetic means 21 is actuated by actuating means 76, 77 under the control of drive means including the one revolution clutch 60 and drive shaft 73.

Figure 8:
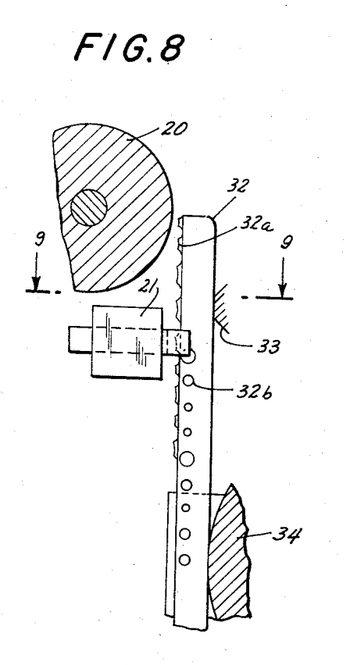
FIG. 8 is a fragmentary side elevation, partially in section, illustrating another embodiment of the invention applied to a type bar construction used in calculators.
Figure 9:
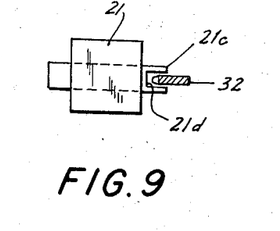
FIG. 9 is a fragmentary sectional view taken on line IX—IX in FIG. 8.
Figures 10, 11:
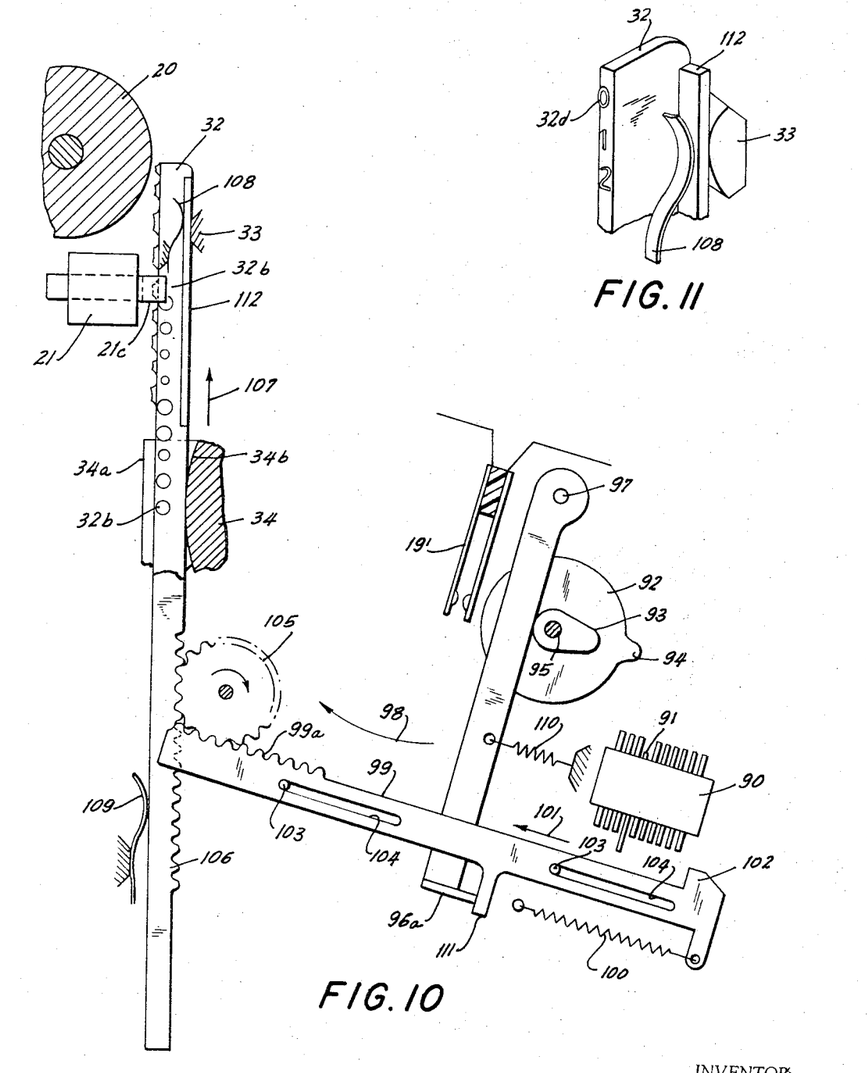
FIG. 10 is a side elevation, partially in section, illustrating the embodiment of FIG. 8 together with switch actuating means and selector means.
FIG. 11 is a fragmentary perspective view illustrating a detail of FIG. 10.

The embodiment of the invention schematically illustrated in FIGS. 8 and 9, and shown in greater detail in FIGS. 10 and 11, refers to printing apparatus of the type generally used in calculators. A platen or other counter-pressure means 20 is located opposite a series of type bars 32, each of which is associated with a decimal order, and has a series of type faces representing digits along the length thereof. Only one type bar 32 is shown in the drawing, and as best seen in FIG. 9, an electromagnetic means 21 has a core 21c formed with a cut-out 21d in which a portion of type bar 32 is located. This portion is formed with holes or bores 32b of different size and diameter respectively associated with type faces 32a. When the uppermost type face 32a, representing a digit having a small size and area is located opposite the impression area of platen 20, a portion of type bar 32 having a large perforation is located in the region of the core 21c and cut-out 21d so that the cross section of the magnetizable type bar available for the magnetic flux of electromagnetic means 21 is comparatively small so that the type bar 32 will be attracted toward the impression area with a comparatively small electromagnetic force.

However, if a character having a large type face is located opposite the impression area in a displaced position of type bar 32, a small bore 32b will be located in the region of core 21c, and consequently the magnetic force by which the type face is pressed against the impression area will be greater, as required for producing an imprint of sufficient density by a large character type face.

The means for selecting a type face, and for energizing the electromagnetic means 21, are illustrated in FIGS. 10 and 11. A standard keyboard, not shown, controls a pin carriage 91 so that in each order of the pin carriage 90, a pin 91 is placed in an actuated position representing a digit in the respective order. An actuated pin 91 is located in the path of movement of a projection 102 of a sensing bar 99 which has longitudinal slots 104 for mounting bar 99 on a pair of pins 103 for movement under the action of a spring 100. Each sensing bar 99 has a rack portion 99a meshing with a pinion 105 which is in meshing engagement with the rack portion 106 of a type bar 32. A stop member 96 is turnable about a pin 97 and is held by a spring 110 in a position in which a projection 96a engages a projection 111 on sensing bar 99, and prevents movement of the same under the action of spring 100. A drive shaft 95 carries a first cam 93 for operating stop member 96, and a second cam 92 with a projection 94 for actuating switch 19′ which corresponds to switch 19 shown in FIG. 1a and is connected into the circuit of electromagnetic means 21.

Each type bar is mounted in a guide groove 34a of a support 34 which has a curved surface 34b. A spring 109 abuts a lower portion of an edge of type bar 32, and another pair of springs 108 abuts a pair of flanges 112 on opposite sides of the upper portion of type bar 32, pressing the same normally against a stationary abutment 33.

After pins 91 of pin carriage 90 have been selected by operation of the keyboard of the calculator, not shown, the total key is pressed, and a machine operation is started. Over a one revolution clutch, not shown, which corresponds to clutch 60 described with reference to FIG. 6, shaft 95 is turned one revolution so that cam 93 displaces stop lever 96 and releases sensing bar 99 for movement in the direction of the arrow 101 until stop projection 102 abuts a selected pin 91 of the pin carriage 90, and sensing member 99 is stopped. The distance of movement of the sensing bar 99 corresponds to the selected digit, pinion 105 is turned a corresponding angle, and type bar 32 is raised a corresponding distance to a position of readiness in which the respective type face 32a representing the selected digit is located opposite the impression area on platen 20, while a magnetizable perforated portion 32b is located in the region of the core 21c of electromagnetic means 21.

After the selected type face has assumed the position of readiness, cam projection 94 of cam 92 engages and closes switch 19' so that electromagnetic means 21 is energized and attracts the type bar which turns against the action of springs 108 in counterclockwise direction about the curved surface 34b. Further turning of shaft 94 causes release of switch 19' and deenergization of electromagnetic means 21 so that springs 108 return the type bar in transverse clockwise direction to its normal position. Spring 110 returns stop lever 96 to its normal position when the same is released by cam 93 so that sensing bar 99 is returned and pulls type bar 32 through pinion 105 down to its normal inoperative position.

It will be seen that drive means 95, 93, 96, 99, 100, 105 effect not only movement of the type bar to a position of readiness in which a type face selected by selector means including pin carriage 90 and a keyboard, is in a position of readiness, but also actuate switch 19' for energizing electromagnetic means 21.

In all embodiments of the invention, the impression means, described as type bars or type heads are moved by drive means to a position of readiness, while the impression is made under the control of electromagnetic means so that the movement to the position of readiness can take place at a very high speed, while the impression is actually made under the control of electromagnetic means 21 at a lower speed and with exactly the necessary force, without producing noise. The operation of the machine nevertheless takes place at very high speed, since the electromagnetic means move the impression means only an extremely small distance.

It will be understood that each of the elements described above, or two or more together, may also find a useful application in other types of printing apparatus differing from the types described above.

While the invention has been illustrated and described as embodied in an apparatus in which an impression means is moved at high speed to a position of readiness located near an impression area, and is moved by electromagnetic means from the position of readiness to an impression making position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for making impressions, comprising, in combination, counterpressure means having an impression area; a plurality of type bars having type faces, each type bar being movable in an arc intersecting said impression area from a position of rest to a position of readiness in which its type face is located near and opposite said impression area and further to an impression making position on said impression area; a power roll; a plurality of coupling means for respectively connecting said type bars with said power roll, each coupling means including a turnable coupling member cooperating with said power roll, and a lever having a fulcrum point and being pivotally connected with said coupling member at a pivot point, said lever having at least one dead center position in which said fulcrum point, said pivot point, and the axis of said turnable couping member are located in the same straight line, said lever being operatively connected with a type bar in such a manner that said type bar is in said position of readiness shortly before said lever is in said dead center position; a plurality of keys connected with said coupling means for selectively placing the same in a position in which said coupling member is driven by said power roll for moving the respective type bar through said lever from said position of rest toward said position of readiness; electromagnetic means located in the region of said impression area for attracting a type bar in said position of readiness to move the same to said impression-making position in which said lever is in said dead center position while the respective type bar engages said impression area with a pressure independent of the speed of movement of said type bars to said position of readiness and dependent only on said electromagnetic means; circuit means including switch means connected with said electromagnetic means; and actuating means operated by said type bars in said position of readiness to close said switch means whereby said electromagnetic means is energized.

2. An apparatus according to claim 1 including a plurality of magnetizable armature portions respectively mounted on said type bars, said armature portions being respectively located opposite said electromagnetic means when the respective associated type faces are located opposite said impression area, said armature portions being arranged and constructed as different magnetic resistances for the magnetic flux of said electromagnetic means corresponding to the area of the respective associated type face so that type faces having larger or smaller areas, respectively, are pressed against said impression area with a greater or smaller magnetic force, respectively.

3. An apparatus according to claim 2 wherein said magnetizable armature portions are plates having U-shaped cross section and abutting three sides of the respective type bars, the leg portions of said U-shaped magnetizable members being of different length corresponding to the different size of the characters of the type faces on the respective type bars.

4. An apparatus according to claim 1, wherein said circuit means includes circuit connected with said electromagnetic means, and including a voltage source, a plurality of resistors, said switch means connected in series with said electromagnetic means, and a capacitor in parallel with the switch means and electromagnetic means; so that said capacitor discharges and produces a short electric impulse for energizing said electromagnetic means.

5. An apparatus according to claim 4 wherein one of said resistors is connected in series with said electromagnetic means and in parallel with said capacitor, and is adjustable for varying the current of said electric impulse flowing through said electromagnetic means in accordance with the desired impression force of said type faces.

6. An apparatus according to claim 1 wherein said lever is a crank lever; wherein said coupling member is driven by said power roll to turn a complete revolution, and moves said crank lever during each revolution through two center positions in which said type bar is, respectively, in said position of rest and in said position of readiness.

7. An apparatus according to claim 6 and including one revolution clutch means operated by each of said keys to place said coupling member in driving connection with said power roll, and to stop said coupling member after a single revolution while disengaging the same from said power roll.

8. An apparatus according to claim 6 wherein said coupling member has at least one projecting portion positioned to engage the surface of said power roll, and at least one recessed portion spaced from the surface of said power roll during turning movement of said coupling member whereby said power roll is separated from said type bars when the latter are in a position between said position of rest and said position of readiness in which an engagement with another type bar is possible.

9. An apparatus according to claim 6 wherein said coupling means include a spring loaded lever connected with each of said type bars, and pivotally connected with said crank lever, and spring means connecting said crank lever with said last-mentioned lever, and other spring means acting on said last-mentioned lever for turning said type bar to said position of rest.

10. An apparatus for making impressions, comprising in combination, counterpressure means having an impression area; a plurality of type bars having type faces, each type bar being movable in an arc intersecting said impression area from a position of rest to a position of readiness in which its type face is located near and opposite said impression area, and further to an impression making position on said impression area; a power roll; a plurality of coupling means for respectively connecting said type bars with said power roll, each coupling means including a coupling member cooperating with said power roll, said coupling member being turnable in one direction of rotation and having at least one recess and cam means leading and trailing said recess in said one direction of rotation, and a lever pivotally connected with said coupling member and operatively connected with the respective type bar, said coupling member driving said lever and said type bar when said cam means is in contact with said power roll, and permitting while said recess is located opposite said power roll, inertia movement of said type bar toward said position of readiness, said lever having a fulcrum point and being pivotally connected with said coupling member at a pivot point, said lever having at least one dead center position in which said fulcrum point, said pivot point and the axis of said turnable coupling member are located in the same straight line, said type bar being in said position of readiness shortly before said lever is in said dead center position, and the leading end of said trailing cam means being in contact with said power roll when said type bar is in said impression making position and said lever is in said dead center position; a plurality of keys connected with said coupling means for selectively placing the same in a position in which said leading cam means is driven by said power roll for moving the respective type bar from said position of rest to said position of readiness; electromagnetic means located in the region of said impression area for attracting type bars in said position of readiness to move the same to said impression making position in which the respective type bar engages said impression area with a pressure independent of the speed of movement of said type bar; circuit means including switch means connected with said electromagnetic means; and actuating means operated by said type bars in said position of readiness to close said switch means whereby said electromagnetic means is energized.

11. An apparatus according to claim 10, wherein said coupling member is driven by said power roll to turn a complete revolution, and moves said lever during each revolution through two dead center positions in which said type bar is, respectively, in said position of rest and in said position of readiness, said coupling member having another recess located opposite said power roll when said type bar is in said position of rest.

References Cited
UNITED STATES PATENTS

| | | | |
|---|---|---|---|
| 1,745,380 | 2/1930 | Quentell | 197—17 |
| 1,795,675 | 3/1931 | Quentell | 197—17 |
| 2,059,537 | 11/1936 | Salzberger et al. | 197—17 |
| 2,114,659 | 4/1938 | Salzberger | 197—17 |
| 2,875,879 | 3/1959 | Auerbach | 197—14 |
| 2,891,649 | 6/1959 | Peterson | 197—14 |
| 3,068,985 | 12/1962 | Arthur | 197—14 |

ROBERT E. PULFREY, *Primary Examiner.*

EDGAR S. BURR, *Examiner.*